(12) United States Patent
Granados Pelaez (10) Patent No.: US 11,020,940 B2
(45) Date of Patent: Jun. 1, 2021

(54) PLATE FOR COVERING HORIZONTAL AND VERTICAL SURFACES

(71) Applicant: EURO TRADE FLOORING, S.L., Sant Esteve Ses Rovires (ES)

(72) Inventor: David Granados Pelaez, Viladecans (ES)

(73) Assignee: EURO TRADE FLOORING, S.L., Barcelona (ES)

( * ) Notice: Subject to any disclaimer, the term of this patent is extended or adjusted under 35 U.S.C. 154(b) by 42 days.

(21) Appl. No.: 16/507,211

(22) Filed: Jul. 10, 2019

(65) Prior Publication Data
US 2019/0330859 A1 Oct. 31, 2019

Related U.S. Application Data

(63) Continuation-in-part of application No. PCT/ES2017/070018, filed on Jan. 12, 2017.

(51) Int. Cl.
*B32B 3/24* (2006.01)
*B32B 5/22* (2006.01)
(Continued)

(52) U.S. Cl.
CPC ............ *B32B 18/00* (2013.01); *B32B 3/266* (2013.01); *B32B 5/02* (2013.01); *B32B 5/16* (2013.01);
(Continued)

(58) Field of Classification Search
None
See application file for complete search history.

(56) References Cited

U.S. PATENT DOCUMENTS 4,315,967 A * 2/1982 Prior .................. B32B 13/08
428/105
5,255,482 A 10/1993 Whitacre
(Continued)

FOREIGN PATENT DOCUMENTS

CN 101012120 A * 8/2007 ............ C04B 28/32
CN 101158205 A * 4/2008
(Continued)

OTHER PUBLICATIONS

International Search Report for PCT/ES2017/070018 dated Jul. 25, 2017 [PCT/ISA/210].
(Continued)

*Primary Examiner* — Jeffrey A Vonch
(74) *Attorney, Agent, or Firm* — Sughrue Mion, PLLC (57) ABSTRACT

A lining plate having an outer decorative layer, a support layer having at least magnesium oxide or magnesium oxide with perlite and/or vermiculite and/or cellulose, a barrier membrane to reduce or avoid water and moisture intrusion, and a self-adhesive foam material layer with an adhesive surface to be placed on a surface to be lined, the layer being provided with a plurality of perforations. The support layer has a non-homogeneous density in its thickness, distinguishing a first thickness, following the decorative layer, and a second thickness, between the first thickness and the barrier membrane, in which the density in the first thickness is greater than the density in the second thickness. The support layer is provided with a reinforcing structure formed by meshes or by a fabric of a composite material located within the second thickness of the support layer.

21 Claims, 7 Drawing Sheets

(51) Int. Cl.

| | | |
|---|---|---|
| *B32B 17/04* | (2006.01) | |
| *B32B 18/00* | (2006.01) | |
| *B32B 27/06* | (2006.01) | |
| *E04F 13/077* | (2006.01) | |
| *E04F 13/14* | (2006.01) | |
| *E04F 15/10* | (2006.01) | |
| *B32B 3/26* | (2006.01) | |
| *B32B 5/18* | (2006.01) | |
| *B32B 7/12* | (2006.01) | |
| *B32B 9/04* | (2006.01) | |
| *B32B 27/30* | (2006.01) | |
| *B32B 27/32* | (2006.01) | |
| *B32B 13/02* | (2006.01) | |
| *B32B 13/04* | (2006.01) | |
| *B32B 27/40* | (2006.01) | |
| *B32B 13/12* | (2006.01) | |
| *B32B 9/00* | (2006.01) | |
| *E04F 13/08* | (2006.01) | |
| *B32B 5/16* | (2006.01) | |
| *B32B 5/02* | (2006.01) | |
| *B32B 5/30* | (2006.01) | |
| *B32B 5/28* | (2006.01) | |
| *E04F 13/18* | (2006.01) | |
| *E04F 13/075* | (2006.01) | |
| *E04F 15/02* | (2006.01) | |
| *B32B 7/14* | (2006.01) | |
| *B32B 29/00* | (2006.01) | |
| *B32B 3/06* | (2006.01) | |
| *B32B 7/06* | (2019.01) | |
| *E04F 15/022* | (2006.01) | |
| *E04F 13/16* | (2006.01) | |

(52) U.S. Cl.
CPC ................ *B32B 5/18* (2013.01); *B32B 5/22* (2013.01); *B32B 5/28* (2013.01); *B32B 5/30* (2013.01); *B32B 7/12* (2013.01); *B32B 9/005* (2013.01); *B32B 9/045* (2013.01); *B32B 9/046* (2013.01); *B32B 13/02* (2013.01); *B32B 13/04* (2013.01); *B32B 13/045* (2013.01); *B32B 13/12* (2013.01); *B32B 17/04* (2013.01); *B32B 27/06* (2013.01); *B32B 27/065* (2013.01); *B32B 27/304* (2013.01); *B32B 27/32* (2013.01); *B32B 27/40* (2013.01); *E04F 13/077* (2013.01); *E04F 13/0866* (2013.01); *E04F 13/14* (2013.01); *E04F 13/18* (2013.01); *E04F 15/105* (2013.01); *E04F 15/107* (2013.01); *B32B 3/06* (2013.01); *B32B 7/06* (2013.01); *B32B 7/14* (2013.01); *B32B 27/30* (2013.01); *B32B 29/007* (2013.01); *B32B 2250/04* (2013.01); *B32B 2250/05* (2013.01); *B32B 2264/062* (2013.01); *B32B 2264/10* (2013.01); *B32B 2264/101* (2013.01); *B32B 2266/025* (2013.01); *B32B 2266/0221* (2013.01); *B32B 2266/0235* (2013.01); *B32B 2266/0278* (2013.01); *B32B 2266/06* (2013.01); *B32B 2266/14* (2016.11); *B32B 2305/022* (2013.01); *B32B 2305/72* (2013.01); *B32B 2307/546* (2013.01); *B32B 2307/712* (2013.01); *B32B 2307/72* (2013.01); *B32B 2307/726* (2013.01); *B32B 2307/732* (2013.01); *B32B 2307/734* (2013.01); *B32B 2307/748* (2013.01); *B32B 2419/04* (2013.01); *B32B 2451/00* (2013.01); *B32B 2471/00* (2013.01); *B32B 2607/00* (2013.01); *B32B 2607/02* (2013.01); *E04F 13/075* (2013.01); *E04F 13/0887* (2013.01); *E04F 13/16* (2013.01); *E04F 13/185* (2013.01); *E04F 15/022* (2013.01); *E04F 15/02155* (2013.01); *Y10S 428/9044* (2013.01); *Y10S 428/9133* (2013.01); *Y10T 428/24331* (2015.01); *Y10T 428/24752* (2015.01); *Y10T 428/24992* (2015.01); *Y10T 428/249953* (2015.04); *Y10T 428/2848* (2015.01)

(56) References Cited

U.S. PATENT DOCUMENTS

| | | | | |
|---|---|---|---|---|
| 2002/0160680 | A1* | 10/2002 | Laurence | B44C 5/0469 442/394 |
| 2005/0208255 | A1* | 9/2005 | Pervan | E04F 15/041 428/60 |
| 2006/0172110 | A1* | 8/2006 | Feigin | C04B 28/32 428/70 |
| 2009/0011670 | A1* | 1/2009 | Wisenbaker, Jr. | E04C 2/04 442/42 |
| 2009/0133361 | A1* | 5/2009 | Vera | E04C 2/044 52/794.1 |
| 2010/0311854 | A1* | 12/2010 | Thiers | E04F 15/02 521/84.1 |
| 2011/0088597 | A1* | 4/2011 | Wu | C04B 28/32 106/686 |
| 2012/0291387 | A1* | 11/2012 | Keane | E04F 15/02038 52/403.1 |
| 2014/0360117 | A1* | 12/2014 | Ko | E04F 15/02016 52/309.1 |
| 2015/0197943 | A1* | 7/2015 | Ziegler | B44C 5/0438 428/161 |
| 2015/0259928 | A1* | 9/2015 | Keane | E04F 15/18 52/747.1 |
| 2016/0158963 | A1* | 6/2016 | Chu | E04C 2/16 428/535 |
| 2016/0369507 | A1* | 12/2016 | Pervan | B32B 13/06 |
| 2017/0136725 | A1* | 5/2017 | Granados Pelaez | B32B 27/08 |
| 2018/0117955 | A1* | 5/2018 | Granados Pelaez | C09J 7/29 |
| 2018/0127987 | A1* | 5/2018 | Bradway | D06N 7/0076 |
| 2018/0283014 | A1* | 10/2018 | Hodgkins | B32B 21/047 |
| 2019/0040635 | A1* | 2/2019 | Baert | E04F 15/02188 |
| 2019/0264449 | A1* | 8/2019 | Welbourn | B32B 9/048 |
| 2020/0123788 | A1* | 4/2020 | Baert | B32B 9/045 |
| 2020/0263440 | A1* | 8/2020 | Chen | E04F 15/102 |
| 2020/0284049 | A1* | 9/2020 | De Rick | B32B 5/18 |

FOREIGN PATENT DOCUMENTS

| | | | | |
|---|---|---|---|---|
| CN | 201148710 | Y * | 11/2008 | |
| CN | 201151989 | Y * | 11/2008 | |
| CN | 201437289 | U * | 4/2010 | |
| CN | 101733832 | A * | 6/2010 | ............ E04B 1/942 |
| CN | 101871246 | A * | 10/2010 | ............ B32B 5/26 |
| CN | 101879792 | A * | 11/2010 | ............ B28B 3/12 |
| CN | 101922225 | A * | 12/2010 | ............ E04F 15/107 |
| CN | 201679178 | U * | 12/2010 | ............ E04B 1/942 |
| CN | 201679185 | U * | 12/2010 | ............ B32B 5/024 |
| CN | 201818002 | U * | 5/2011 | ............ E04F 15/107 |
| CN | 202081604 | U * | 12/2011 | |
| CN | 102304946 | A * | 1/2012 | |
| CN | 102383525 | A * | 3/2012 | ............ C04B 28/32 |
| CN | 202324457 | U * | 7/2012 | |
| CN | 202359769 | U * | 8/2012 | |
| CN | 202493001 | U * | 10/2012 | |
| CN | 102777002 | A * | 11/2012 | |
| CN | 102826824 | A * | 12/2012 | ............ B32B 5/26 |
| CN | 202668696 | U * | 1/2013 | |
| CN | 202850416 | U * | 4/2013 | |
| CN | 203049992 | U * | 7/2013 | |
| CN | 103243883 | A * | 8/2013 | |
| CN | 103334508 | A * | 10/2013 | |
| CN | 103467059 | A * | 12/2013 | |
| CN | 103588462 | A * | 2/2014 | |
| CN | 103979920 | A * | 8/2014 | |

(56) References Cited

FOREIGN PATENT DOCUMENTS

| | | | | | |
|---|---|---|---|---|---|
| CN | 104060792 | A | * | 9/2014 | |
| CN | 203878907 | U | * | 10/2014 | |
| CN | 104131668 | A | * | 11/2014 | |
| CN | 104131680 | A | * | 11/2014 | ............... B28B 3/12 |
| CN | 203924604 | U | * | 11/2014 | |
| CN | 104196195 | A | * | 12/2014 | ............ E04F 15/107 |
| CN | 104309255 | A | * | 1/2015 | |
| CN | 204112656 | U | * | 1/2015 | |
| CN | 204238501 | U | * | 4/2015 | |
| CN | 104594605 | A | * | 5/2015 | |
| CN | 104805986 | A | * | 7/2015 | |
| CN | 104817311 | A | * | 8/2015 | |
| CN | 204609172 | U | * | 9/2015 | |
| CN | 104975693 | A | * | 10/2015 | |
| CN | 105040941 | A | * | 11/2015 | |
| CN | 105130350 | A | * | 12/2015 | |
| CN | 105130374 | A | * | 12/2015 | |
| CN | 105133807 | A | * | 12/2015 | |
| CN | 204899096 | U | * | 12/2015 | ............. B32B 5/024 |
| CN | 204960206 | U | * | 1/2016 | |
| CN | 105604277 | A | * | 5/2016 | |
| CN | 105622044 | A | * | 6/2016 | |
| CN | 205661087 | U | * | 10/2016 | |
| CN | 205661091 | U | * | 10/2016 | |
| CN | 205661098 | U | * | 10/2016 | |
| CN | 205663098 | U | * | 10/2016 | |
| CN | 106242489 | A | * | 12/2016 | |
| CN | 106284894 | A | * | 1/2017 | |
| CN | 106368398 | A | * | 2/2017 | ............ E04F 13/077 |
| CN | 106522494 | A | * | 3/2017 | ............ E04F 15/041 |
| CN | 205997441 | U | * | 3/2017 | ............ B32B 13/08 |
| CN | 206016154 | U | * | 3/2017 | ............ E04F 15/105 |
| CN | 106677478 | A | * | 5/2017 | ........ E04F 15/02038 |
| CN | 106738201 | A | * | 5/2017 | |
| CN | 106747238 | A | * | 5/2017 | ........... B32B 27/304 |
| CN | 107176802 | A | * | 9/2017 | |
| CN | 207194352 | U | * | 4/2018 | |
| DE | 10159340 | A1 | * | 6/2002 | ............. B32B 13/14 |
| DE | 102012000468 | A1 | * | 7/2013 | ............... B32B 5/26 |
| DE | 102013113478 | A1 | * | 6/2015 | ........... E04F 15/107 |
| EP | 1493878 | A1 | * | 1/2005 | ............. B32B 21/02 |
| EP | 2060389 | A1 | * | 5/2009 | ............. B32B 13/04 |
| EP | 2 960 397 | A1 | | 12/2015 | |
| ES | 1078107 | U | * | 11/2012 | |
| FR | 2956691 | A1 | * | 8/2011 | ............. E04B 1/942 |
| GB | 2 451 795 | A | | 2/2009 | |
| JP | 09302805 | A | * | 11/1997 | |
| JP | 2000274054 | A | * | 10/2000 | ............. B32B 13/14 |
| JP | 2013057182 | A | | 3/2013 | |
| JP | 2013158944 | A | | 8/2013 | |
| JP | 2013158950 | A | | 8/2013 | |
| RU | 2062701 | C1 | * | 6/1996 | |
| WO | WO-2010104158 | A1 | * | 9/2010 | ............. E04F 15/02 |
| WO | WO-2011155065 | A1 | * | 12/2011 | ............ E04F 15/107 |
| WO | WO-2012139513 | A1 | * | 10/2012 | ............. E04F 15/10 |
| WO | WO-2015051419 | A1 | * | 4/2015 | ............... B28B 3/12 |
| WO | WO-2016134243 | A2 | * | 8/2016 | ............. B32B 5/024 |
| WO | 2016/192805 | A1 | | 12/2016 | |
| WO | WO-2017190449 | A1 | * | 11/2017 | ............ E04F 13/077 |
| WO | WO-2018136022 | A1 | * | 7/2018 | ............. B32B 13/08 |
| WO | WO-2019043185 | A1 | * | 3/2019 | ............ E04F 15/041 |
| WO | WO-2019043190 | A1 | * | 3/2019 | ............ E04F 15/105 |
| WO | WO-2019197393 | A1 | * | 10/2019 | ........... B32B 27/304 |
| WO | WO-2020114645 | A1 | * | 6/2020 | ........ E04F 15/02038 |

OTHER PUBLICATIONS

Written Opinion for PCT/ES2017/070018 dated Jul. 25, 2017 [PCT/ISA/237].

* cited by examiner

PLATE FOR COVERING HORIZONTAL AND VERTICAL SURFACES

CROSS REFERENCE TO RELATED APPLICATIONS

This application is a Continuation-In-Part of Application No. PCT/ES2017/070018 filed Jan. 12, 2017, the entire contents of which is incorporated herein by reference.

TECHNICAL FIELD OF THE INVENTION

The present invention relates to a lining plate for lining horizontal surfaces, such as floors or pavements, and vertical surfaces such as walls. The lining plate is a multi-layer lining plate which comprises a decorative layer provided with decorative motifs which are visible from the outside, a support layer and a self-adhesive layer intended to be placed on the surface to be lined.

BACKGROUND OF THE INVENTION

Nowadays, there is a wide variety of lining plates for horizontal and vertical surfaces. In addition to the quality and the outer decorative design of the plate, an important factor in the selection of a specific type of lining for project planners, installers and users is the way in which these lining plates are fixed to the surface to be lined, since the speed with which the plates are placed, the time and money saved on labor, the stability and the permanence of their position over time all depend on this factor.

One example of a quick and simple placement is a lining with self-adhesive vinyl floor tiles, which in turn has inspired many users to try to apply said tiles to vertical surfaces such as walls, yet without the expected success, given that they become detached in a short period of time. There have also been attempts to improve the adhesive quality of the self-adhesive layer by varying its chemical composition, but this leads to an increase in production costs for the tiles.

Furthermore, it is also known that the lining plates are usually provided with male-female type connectors or click connectors on the edges thereof, in which the tab of the edge of a plate is fitted in a slot or groove on the edge of the contiguous section. However, the temperature variations to which lining plates are subjected once they are placed often causes the plates to separate, and may even cause the connections to break.

To avoid these problems, the current trend is to forgo these types of connectors and opt for self-supporting flooring, which remain in place by their own weight, known as loose lay flooring, which do not require adhesive and are made up of plates with a main vinyl layer of approximately 5 mm, adhered to a rubber layer which is in contact with the surface of the floor that is to be lined. If the floor to be lined has any imperfections on its surface, this type of lining covers them up, as long as they do not protrude more than approximately 0.3 mm. Furthermore, it is worth mentioning that the durability of said lining plates with regard to temperature variations is not up to par, given that the material they are made of is not a stable material, and therefore with cold temperatures the plates end up separating from one another and opening up at the joints, and at high temperatures the rubber can leave a residue.

Therefore, an alternative to loose lay flooring is what is known as peel and stick lining, made up of self-adhesive plates approximately 2 mm thick and provided with an adhesive glue on the bottom face thereof. Unfortunately, the glue with which they are provided does not have an adhesive effect if the temperature is below 10° C., and at temperatures above 30° C. it undergoes a process and transforms into an oily substance which has no ability to adhere to the surface it is meant to cover. It also requires prior preparation of the floor to be covered, during which it is smoothed out, since imperfections of 0.15 mm are noted through these lining plates and therefore they do not constitute an aesthetically acceptable lining.

The application WO2016/192805 describes a decorative multi-layer lining plate for horizontal and vertical surfaces, such as floors and walls. The lining plate comprises a decorative layer provided with decorative motifs which are visible from the outside once the lining is placed, a support layer and a self-adhesive layer intended to be placed on the surface to be lined. The special feature of this lining is that the self-adhesive layer thereof is a layer with circular perforations of a polymeric foam material, such as IXPE (irradiation cross-linked polyethylene) foam, the outer surface of which is provided with an adhesive. The circular perforations with which the foam material layer is provided allow the user or worker who applies the lining on the wall to fill in said perforations with silicone or glue, thereby reinforcing the adhesive properties of the lining on the surface of the wall, in addition to the adhesive action of the adhesive which is already provided on the outer surface of the foam material layer. Moreover, the IXPE contributes to the adaptation of the lining plate to the imperfections of the walls or floors, compressing the protruding imperfections and occupying the space in the small recesses without the real finishing of the lined surface being visible through the lining plate.

Although the previously described plate has good results for lining both horizontal and vertical surfaces, it turns out that when it is time to remove the lining, the adhesive is so effective that when peeling the lining plates off, they usually break, leaving part of the foam material layer adhered to the wall, said layer breaking into two or more pieces, which slows down the process of placing a new lining, given that all of it must be removed beforehand, and also does not allow the lining plate to be repositioned. Another similar situation is when one section of the lining plate has been damaged and must be removed and substituted by another one. In many occasions this substitution not only requires removing the damaged plate, but also those around it, in order to have enough space to be able to remove it. The lining plates around it cannot be put back on because the adhesive part becomes damaged.

Therefore, it would be ideal to be able to have a lining plate that were suitable for both horizontal and vertical surfaces, which were easy to place and remove and which did not leave any residue stuck to the surface, which were available to any user, durable and maintained stable dimensions in spite of temperature variations in the environment of the surfaces that require lining and which allowed the imperfections of the horizontal and vertical surfaces to be covered up without having to carry out any prior treatment in order to smooth them out before applying the lining.

On the other hand, U.S. Pat. No. 9,593,493 B2 discloses a multilayer lining plate for essentially horizontal support surfaces such as floors or floor coverings, comprising a ductile upper decorative layer joined to a main layer which is more rigid than the decorative layer, and a continuous third layer arranged below the main layer and that is flexible relative to the main layer. At least one part of the main layer is made of magnesium oxide, fibrocement or mortar with perlite and vermiculite. The continuous third layer is of polyvinyl chloride or a wood-plastic composite material.

The materials of the main layer have an excellent behavior with respect to temperature changes and in humid environments because although they can absorb water, they do not swell, i.e., they are dimensionally very stable, while at the same time they give the panel the strength necessary for supporting the weight and mechanical requirements that are typical of a lining for a horizontal support surface such as a floor or floor covering. Furthermore, both fibrocement and magnesium oxide which can be the material of the main layer have excellent coefficients of thermal expansion and of thermal shrinkage. Despite not swelling, the fact is that the main layer, when it comprises magnesium oxide, has a certain permeability and absorbs moisture that may come from the walls to be lined. Approximately it can absorb up to 10% of water, which does not destabilize the main layer but causes the water to come out next to the adjacent layers or maintain the humidity level, thus being able to deteriorate the quality of the other layers and even make visible damp spots on the visible side of the lining plate. Maintaining a continuous level of moisture or humidity in the plates can be very harmful, not only from an aesthetic or functional point of view, but from a healthy one because fungi, bad odors and other unhealthy effects can appear depending on the environmental conditions of the place where the surface to be lined is.

It has also been observed in practice, that the joint of the main layer comprising magnesium oxide with the decorative layer is not always as effective as desired. The decorative layer, which is preferably made of vinyl, particularly of luxury vinyl tile (LVT), that is mainly made of polyvinyl chloride (PVC), is very sensitive to heat and temperature changes that greatly affect the layer resulting in a very poor dimensional stability. In adverse conditions of heat exposure, a PVC or luxury vinyl tile will experience an expansion effect of up to 0.15% with respect to its initial size at room temperature of ±23° C. It can also bow and deform, losing its initial planimetry and therefore becoming detached or this bow could be transferred somehow to the layer under thereof, undermining some of its initial benefits.

Additionally, it is also known that when placing the lining plates on the vertical or horizontal surface, a small separation distance or gap must be left between the lateral side of a plate and the lateral side of the adjacent plate, which is known as joint, and a cord of sealing material, such as silicone, is provided to protect the surface to be lined from moisture that may come from outside (from the room in which the surface to be lined is located or even when the lined surface is cleaned with liquid materials). In spite of the improved adaptation to the irregularities that the surface of the wall or the floor to be lined can present by the provision of a layer of foam material joined to the main layer, sometimes the existence of these irregularities becomes visible in the joints between plates. A uniformity in the appearance of all silicone cords cannot be assured, resulting in wider and narrower cords, showing discontinuous level changes between the visible sides of adjacent lining plates. This fact is especially evident when cleaning the coated surface, since the discontinuities between the plates can be felt to the touch.

DESCRIPTION OF THE INVENTION

In order to provide a solution to some of the aforementioned drawbacks, the present invention discloses a lining plate for horizontal and vertical surfaces which comprises a decorative outer layer, a support layer and a self-adhesive layer. The self-adhesive layer is made of a foam material with an outer surface provided with an adhesive and is the layer which is intended to be placed on the horizontal or vertical surface to be lined. Moreover, the self-adhesive layer is provided with a plurality of perforations. The lining plate has a rectangular format, that is to say, it has four lateral sides.

The outer decorative layer is made of a luxury vinyl tile (LVT), a polyurethane (PU) sheet or a polyvinyl chloride (PVC) sheet, and has a thickness comprised between 0.5 mm and 5 mm. LVT is made up of several layers, the main component of which is PVC.

The support layer, that is joined to the outer decorative layer, comprises magnesium oxide, magnesium oxide with perlite and/or vermiculite and/or cellulose, and has a thickness comprised between 3 and 10 mm, The foam material of the self-adhesive layer has a density which is the same as, or greater than, 50 Kg/m$^3$ and has a thickness comprised between 1 mm and 10 mm.

The inventors have established that it is necessary that in the foam material of the self-adhesive layer there be a balance between the deformation that occurs when stretching the lining plate to remove it and its compressive quality to absorb the irregularities that may be on the vertical or horizontal surface to be lined. Thus, they have determined that this balance may be found in the density of the foam material, discovering that the lower the density, the more open the foam cells are and the more holes there are, and therefore there are fewer inner walls, making it so that the foam material more breaks away more easily when removing the lining plate. Densities which are the same or greater than 50 Kg/m$^3$ provide an inner structure of cells that allow the lining plate, preferably for horizontal surfaces, to be stuck and unstuck several times without affecting the integrity of the foam material of the self-adhesive layer.

The foam material is a polymeric material selected from the group made up of irradiation cross-linked polyethylene (IXPE) foam, ethylene-vinyl acetate (EVA) foam, polyurethane (PU) foam and polyvinyl chloride (PVC) foam. The preferred foam material is irradiation cross-linked polyethylene (IXPE) foam.

Although the perforations may have different shapes, such perforations with a circular base, according to a preferred embodiment of the invention, the perforations have an oblong contour on the outer surface of the self-adhesive layer, i.e., the contour thereof defines a shape that is longer than it is wide. Each perforation has an elliptical base or a rectangular base with rounded corners, similar to the contour of a capsule, and such a base has an area comprised between 0.7 cm$^2$ and 20 cm$^2$.

The perforations with which the foam material layer is provided allow the user or worker who applies the lining sheet on the horizontal or vertical surface to fill in said perforations with silicone or glue, or with a similar material, thereby reinforcing the adhesive properties of the lining sheet on the horizontal or vertical surface, adding to the adhesive action of the adhesive which is already provided on the outer surface of the foam material layer. When the lining plate is to be applied to a vertical surface, the perforations of the lining plate will be filled with said glue, preferably acrylic-based, so that the lining plate adheres better to the surface and resists its own weight. With regard to the lining plate on horizontal surfaces, in the majority of the cases it is not necessary to fill in the perforations, except in situations in which there are many people passing over them or the finishing of the horizontal surface is porous and has imperfections. Moreover, the perforations themselves are in indication for the user or worker as to where they must apply the glue or a similar product, making this task easy to perform.

Preferably, the adhesive of the self-adhesive layer comprises ethyl acetate or a copolymer of ethylene-vinyl acetate.

Thus, according to a first preferred embodiment, some or all of the perforations are placed on the pavement, floor, or wall with the perforations filled with a filler of acrylic-based glue. The combination of the choice of a foam material with a density of at least 50 Kg/cm$^2$ together with the aforementioned acrylic-based glue for filling the oblong perforations guarantees that the lining plate will stick and peel off without any of the lining remaining stuck to the surface after it is removed from the horizontal or vertical surface.

According to a characteristic of the first preferred embodiment of the lining plate of the invention, the perforations are arranged in a staggered formation throughout the entire surface of the plate. By staggered formation arrangement, we mean that the perforations form parallel rows such that the perforations of one row are arranged in order to be at the halfway point between the holes of the next row over, such that they preferably form equilateral triangles. This staggered formation prevents straight continuous strips (horizontal or vertical) of adhesive surface from existing on central areas of the outer surface of the self-adhesive layer, since said strips would make it likely for part of the foam material to remain stuck on the horizontal or vertical surface from which the lining plate is being removed. It is worth pointing out that the outer surface provided with an adhesive on the self-adhesive foam material layer preferably has a perimeter margin devoid of perforations, and therefore on these margins there are straight continuous strips provided with adhesive, however due to the perimeter position thereof, the inventors have tested them and found that they do not leave any residue when the lining plate is peeled off and they guarantee greater resistance to steps or pressure, which provides an advantage given that the perimeter of a plate is often a critical part with a higher likelihood of becoming damaged or broken. An improved effect is achieved when the perforations have an oblong contour.

According to another characteristic of the first preferred embodiment of the lining plate of the invention, the oblong perforations are oriented with the longest side thereof arranged parallel to one of the two sides of the lining plate. Preferably, the longest side of the oblong perforations is parallel to the longest side of the lining plate.

The perforation surface of the self-adhesive foam material layer is comprised between 10% and 90% of the total surface of one of the two faces of the support layer, distributed in several perforations. Preferably, the perforation surface represents between 50% and 80% of the total surface of one of the two faces of the support layer, even more preferably between 60% and 70%. As was previously stated, the perforations have an elliptical or rectangular base with rounded corners. The perforated surface that represents a perforation on the outer surface of the self-adhesive layer depends on the total surface of the plate, although by way of example, a perforation may be from 0.7 cm$^2$ to 20 cm$^2$. In fact, it has been proven that it is much more advantageous to distribute the perforated surface of the foam material layer in to a greater number of perforations of a smaller size than to distribute it in to a smaller number of perforations of a greater size.

According to another characteristic of the invention, the self-adhesive layer has preferably a thickness comprised between 1.5 and 2.5 mm. The thickness of the foam material layer helps make the irregularities that may be found on the outer surface of the floor or wall to be uniform, making it so they are not visible from the outside once the lining plate is in place. For example, if the outer surface of the floor or wall has a certain relief as a result of an antique finishing which the user would like to cover by applying the lining plate which is the object of the invention, the foam material layer will deform in the areas in which it is applied over a protrusion or relief of the floor or wall, becoming permanently compressed in said areas in order to be at the same level as the rest of the foam material layer which is devoid of such irregularities. Furthermore, if the prior finishing of the surface to be lined is tile, the foam material will occupy the entire space of the joints, below the level of the tiles in order to make it level.

In accordance with another characteristic of a preferred embodiment of the invention, the support layer comprises magnesium oxide or magnesium oxide with perlite and/or vermiculite and/or cellulose, and the thickness thereof is comprised between 3 and 5 mm. In addition to providing a robust quality to the plate, these materials have a high dimensional stability, since they absorb water or moisture without swelling or varying their dimensions, especially in the case of magnesium oxide. Moreover, they have good expansion and contraction coefficients which have been tested in conditions of temperatures to which lining plates for floors and walls are subjected.

Current regulations for modern synthetic floors require determining the dimensional stability of the lining plates for support surfaces which are essentially horizontal, such as floors or pavement. Therefore, a test is done in which a test piece of the lining plate, initially at 23° C., is heated to an extreme temperature of 80° C. for 360 minutes, and after said time period the heating process is halted and the stable temperature of 23° C. is established once again. This test is used to measure the planimetry of the plate in a situation in which, for example, a ray of sunlight is shining through a window and heating up a specific area of the plate to an extreme temperature (as done by a magnifying glass).

Tests on the dimensional stability of the plate of the invention show a curling of 0 mm, essentially nonexistent, and a very favorable average dimensional change of 0.10%, the opposite of other plates which combine WPC and vinyl and which have a curling at the edges that is to such a degree it cannot be measured. Thus, the lining plate according to the invention has a better dimensional stability than the wooden plates, or others of a similar nature, even with a decorative vinyl layer. Floors made of vinyl and other polymers also have a very good dimensional stability, meaning that although they heat up, they do not permanently deform, and they return to their original dimensions.

However, the determination of dimensional stability does not provide information on the performance of lining plates for floors when they are at temperatures below 23° C.

Therefore, although the vinyl or plastic plates can pass the regulatory test for dimensional stability, that does not mean said plates will be suitable in conditions of everyday use. In fact, it is important to consider that the floor or wall of a room will hardly ever be consistently at 23° C. In the summer, the floor plates may be above 45° C. for prolonged periods, and in winter they may be below 5° C., for example if they are placed in an industrial warehouse. There are no standards in the flooring sector for testing how much the dimensions of a plate may vary under the aforementioned conditions, in spite of the fact that in everyday use, the expansion and contraction coefficients play a crucial role, as has been verified by the inventors in their professional experience in the flooring sector.

The inventors are aware of the importance of these expansion and contraction coefficients since they have observed the serious problems that can happen when the plates have high coefficients. If the expansion coefficient is high, the length of the plate increases, making it so that the plate may extend into the next plate, the male connection profile at the end thereof penetrating into the female connection profile of the next plate, causing the female connection tab to move upwards and possibly break. If the contraction coefficient is high, the length of the plate shortens and the distance between the two contiguous plates increases, causing the joint to open. This is what happens in cold environments with PVC plates; the length of the plates shortens and the joints open.

Due to the fact that the inventors have detected the relevance of these coefficients, they have done tests on the lining plate of the invention, as well as on other types of plates, such as lining plates known as resilient flooring, made out of WPC, PVC and copolymers. In order to determine these coefficients, they created the following test procedure. The expansion test consists of: a) stabilizing the sample of the plate at 23° C. and measuring its dimensions, b) heating it to 40° C. and stabilizing it, and then measuring its dimensions, and c) allowing the sample to cool and stabilize at 23° C., and then once again measuring its dimensions. The expansion test consists of: a) stabilizing the sample of the plate at 23° C. and measuring its dimensions, b) cooling it to 5° C. and stabilizing it, and then measuring its dimensions, and c) allowing the sample to cool and stabilize at 23° C., and then once again measuring its dimensions.

The lining plates of the invention had an expansion of an average length of 0.11 mm/lm (lm stands for linear meter) at 40° C. and an average contraction of a length of 0.48 mm/lm at 5° C. In turn, the resilient plate had much higher values, the average expansion being a length of 1.29 mm/lm mm/lm at 40° C. and an average contraction length of 1.19 mm/lm at 5° C. Therefore, the differences with regard to expansion and contraction are highly significant and clearly show that the plates of the invention perform better and do not experience the aforementioned problems.

According to another characteristic of the invention, the decorative layer is a luxury vinyl tile (LVT), or a polyurethane (PU) or polyvinyl chloride (PVC) sheet with a thickness comprised between 0.5 mm and 5 mm, even more preferably between 1.5 mm and 2 mm. LVT is a vinyl sheet option which has a natural look of real stone or ceramic but the resistance and durability of a resistant vinyl floor. Through authentic images and a surface texture, LVT, PU or PVC successfully imitate the patters of stone and other materials in order to provide an appearance that is as close to real as it gets. In addition to an appearance that is unmatched, other benefits include easy maintenance and resistance to moisture. LVT is made up of several layers, the main component of which is PVC, making it dimensionally stable and flexible and a preferred option.

According to another characteristic of the invention, the perforations of the self-adhesive foam material layer reach to the bottom face of the support layer. This constitutes a major advantage in the case of underfloor heating, improving the coefficients of efficiency, since the perforations allow the underfloor heat to rise, the support layer receiving the heat of the ducts of the underfloor heating and transmitting it to the upper outer surface of the lining placed on the floor or pavement. In the cases of lining vertical surfaces, as was previously mentioned, the perforations comprise an acrylic-based glue on the inside thereof which joins the vertical surface to the core of the plate, meaning the support layer, since the perforations reach this layer.

The adhesive of the self-adhesive layer is covered on its outer side by a removable sheet of paper. This removable sheet of paper is removed from the lining plate by the user just before applying it to the horizontal or vertical surface, thus preventing the lining from adhering to other surfaces or taking an incorrect position.

According to a second aspect of the invention, the inventors have considered another lining plate for vertical and horizontal surfaces, which comprises at least one of the following layers arranged in order from an exposed face, intended to be exposed to the exterior, to a hidden face, intended to be oriented to the surface to be lined:

an outer decorative layer;

a support layer comprising at least one of the following materials from the group consisting of magnesium oxide, magnesium oxide with perlite and/or vermiculite and/or cellulose;

a self-adhesive foam material layer with a surface provided with an adhesive surface intended to be placed on the surface to be lined, the self-adhesive foam material layer being provided with a plurality of perforations;

wherein the lining plate comprises a barrier layer or a barrier membrane to reduce or avoid water and moisture intrusion provided between the support layer and the self-adhesive foam material layer;

wherein the support layer has a non-homogeneous density in its thickness, distinguishing a first thickness, following the decorative layer, and a second thickness, between the first thickness and the barrier layer or the barrier membrane, in which the density of the support layer in the first thickness is greater than the density in the second thickness;

and wherein the support layer is provided with a reinforcing structure formed by meshes or by a fabric, being of a composite material, the reinforcing structure being located within the second thickness of the support layer.

According to a preferred embodiment of the above-mentioned lining plate, the barrier layer or the barrier membrane is made of hydrophobic polyurethane, and the composite material of the reinforcing structure is made of fiberglass. The hydrophobic polyurethane is applied in the form of a varnish or paint and been dried it forms the barrier layer or the barrier membrane.

According to another feature of this lining plate, density in the first thickness of the support layer is greater than 1000 $Kg/m^3$ and density in the second thickness of the support layer is less than 1000 $Kg/m^3$. In particular, density in the first thickness of the support layer is comprised between 1100 and 1200 $Kg/m^3$, and density in the second thickness of the support layer is comprised between 800 and 900 $Kg/m^3$.

The average density of the support layer with magnesium oxide is of the order of 1050 $Kg/m^3$. However, the support layer does not have a homogeneous density, since from its manufacturing process results a layer in which approximately half of its total thickness has a different density than the other half of the total thickness. This density difference is favorable to achieve a balance between the different layers that form the lining plate, seeking a transition of densities from a higher value in the decorative layer to a lower value in the layer of foam material.

Magnesium oxide particles are smaller and heavier particles than most of the other components that make up the support layer. To form the support layer there is a rectangular mold formed by a rectangular base and a perimeter frame, or a tray, the base being supported horizontally. Several components are poured into the mold or tray. Among said components there is a base material that sets or hardens when drying, or a chemical binder, mineral particles such as perlite or vermiculite, aggregates, high performance modifiers, pigments, etc. When the magnesium oxide is added to the materials already poured into the mold, by gravity and their small size in relation to the other components, the magnesium oxide particles passes between the other components and are deposited to a greater extent in the lower half of the mold thickness. In addition, the mold or the tray is also subjected to vibration and then is left to dry. The bottom of the mold, where most of magnesium oxide particles are deposited, presents a surface of fine finish, since said particles are of small size. For this reason, this surface of the support layer is chosen for its subsequent bonding by gluing with the decorative layer, since it ensures a greater contact surface for the connection and in particular, a balance between the contraction and expansion behavior.

It is highlighted that according to the preferred embodiment, at least two of lateral sides of the lining plate opposite each other are each one configured by a first inclined lateral surface, which encompasses at least the whole part of the lateral side corresponding to the decorative layer, and by a second inclined lateral surface, which encompasses the rest of the lateral side of the lining plate. The intersection of the two inclined lateral surfaces forms an edge projecting on the part of the lateral side corresponding to the support layer. The first inclined lateral surface and the second inclined lateral surface form an inner angle greater than 70° and less than 180°.

With regard to a second preferred embodiment, the lining plate has four lateral sides and each one is configured by a first inclined lateral surface, which encompasses at least a part of the lateral side corresponding to the decorative layer, and by a second inclined lateral surface, which encompasses the rest of the lateral side of the lining plate. The intersection of the two inclined lateral surfaces of each lateral side forms an edge projecting on the part of the lateral side corresponding to the support layer. The first inclined lateral surface and the second inclined lateral surface of each lateral side form an inner angle greater than 70° and less than 180°.

In a further preferred embodiment, the second inclined lateral surface, which configures the part of the lateral side of the lining plate encompassing the part from the projecting edge to the self-adhesive foam material layer, forms an angle comprised between 75° and 80° measured from the outside of the second inclined lateral surface with a plane parallel to the surface of the hidden face of the lining plate intended to be oriented to the surface to be lined.

Each projecting edge is located in the part of a respective lateral side corresponding to the first thickness of the support layer, wherein the first inclined lateral surface encompasses the whole part of the lateral side of the decorative layer and a part of the lateral side of the first thickness, and wherein the second inclined lateral surface encompasses the remaining part of the lateral side of the lining plate which goes from the projecting edge to the adhesive surface of the self-adhesive foam material layer.

The first thickness and the second thickness of the support layer have preferably a similar or a same thickness value, comprised between 1.3 and 1.8 mm. For instance, the first thickness and the second thickness of the support layer have each one thickness value of 1.5 mm.

The most preferred embodiment is that wherein the self-adhesive foam material layer is made of irradiation cross-linked polyethylene (IXPE) foam, wherein the decorative layer is a luxury vinyl tile (LVT) with a density comprised between 1450 $Kg/m^3$ and 1550 $Kg/m^3$, and wherein the adhesive with which the surface of the self-adhesive foam material layer is provided comprises as main component ethyl acetate.

The inventors have also considered that the support layer further comprises magnesium sulfate. The support layer, besides magnesium sulfate, may also comprise pearlite, bits of wood and lithopone.

With regard to the perforations of the self-adhesive foam material layer, they reach the barrier layer or the barrier membrane in such a way that the bottom of each perforation is formed by a section of the barrier layer or the barrier membrane, and the perforations have an elliptical or oblong contour on the adhesive surface.

The lining plate has a rectangular format, and in a preferred way, a perforation is provided in each corner area of a rectangle which configures the hidden face of the lining plate. The lateral margins of said rectangle are provided at least with a perforation located between the corner perforations.

With regard to a third aspect of the invention, the inventors have considered a kit for lining vertical and horizontal surfaces, comprising a plurality of lining plates as defined previously according to the second aspect of the invention, and wherein two or the four lateral sides of the lining plate opposite each other are each one configured by the above-explained first inclined lateral surface and the second inclined lateral surface, intersecting forming the edge projecting on the part of the lateral side corresponding to the support layer. The kit of the invention further comprises a first container of an acrylic-based glue for filling some or all of the perforations of the lining plates, and a second container of sealant silicone to apply in a gap between the respective second lateral surfaces of pairs of lining plates to be disposed adjacent.

BRIEF DESCRIPTION OF THE DRAWINGS

The accompanying drawings illustrate, by way of non-limiting examples, preferred embodiments of the lining plates, object of the invention. In said drawings.

DESCRIPTION OF THE DRAWINGS

Figure 1:
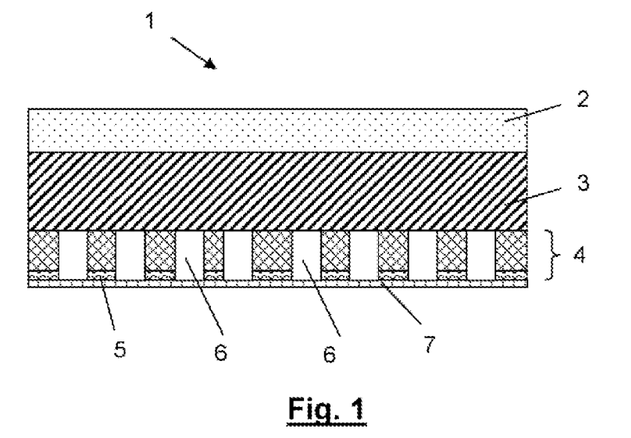
FIG. 1 is a cross-sectional view of a rectangular lining plate, object of the invention according to its first aspect, according to a cross section in a parallel direction to the shortest side of the plate.
Figure 2:
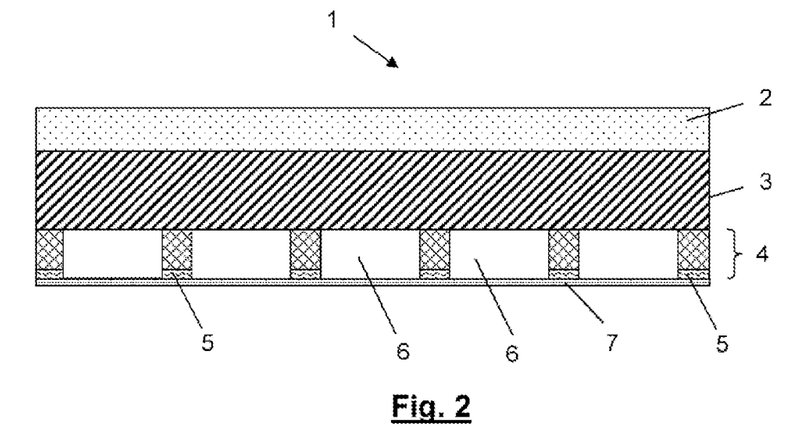
FIG. 2 is a cross-sectional view of the plate in FIG. 1 but according to a cross section with a direction parallel to the longest side of the plate.

FIGS. 1 and 2 schematically show a transverse cross section and a longitudinal cross section of the lining plate 1 in a rectangular format for lining horizontal surfaces 10 (see FIG. 6), such as floors or pavement and vertical surfaces, such as walls.

Figure 3:
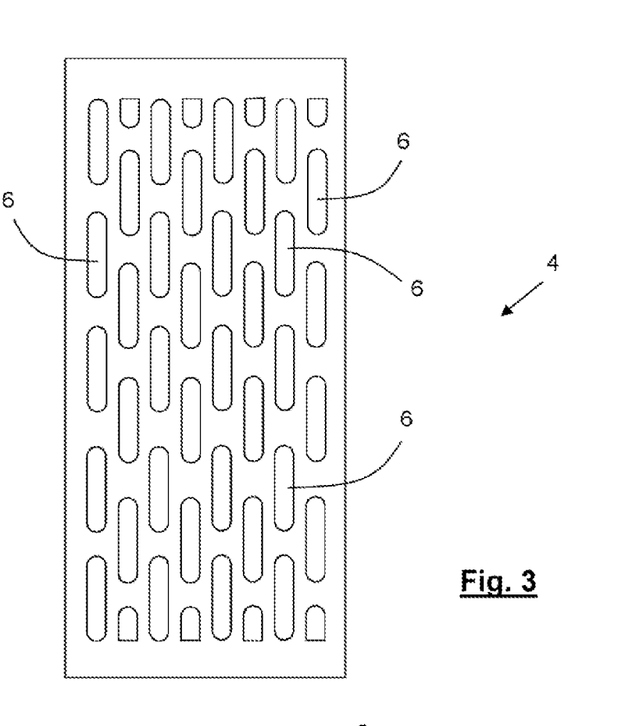
FIG. 3 is a plan view of the outer surface of the self-adhesive foam material layer provided with oblong perforations of the plate in FIG. 1.
Figure 5:
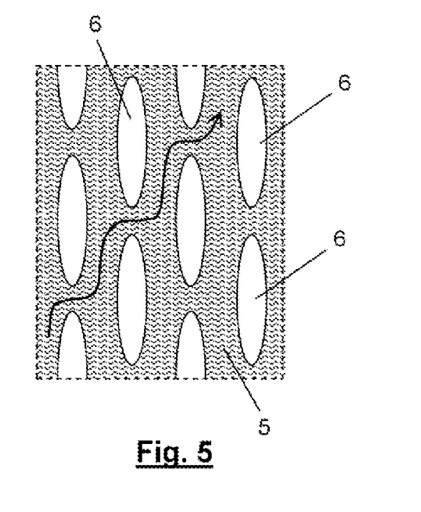

The lining plate 1 represented comprises several layers, among which it is relevant to mention an outer decorative layer 2, a support layer 3, which constitutes the resistant core of the plate, and a self-adhesive layer 4 made of a foam material, specifically ethylene-vinyl acetate, known as EVA, with a density of at least 50 Kg/m$^3$ (preferably between 100 and 200 Kg/m$^3$), and with an outer surface provided with an adhesive 5 which preferably comprises ethyl acetate or a copolymer of ethylene-vinyl acetate. The self-adhesive layer 4 is intended to be placed directly on the horizontal or vertical surface 10 which is to be lined, and has the special feature of being provided with a plurality of perforations 6, each one of which defines a perforation with an oblong contour on the outer surface of the self-adhesive layer 4, i.e., the contour thereof defines a shape that is longer than it is wide. Preferably, each perforation 6 has a rectangular base with rounded corners, similar to the contour of a capsule, as shown in FIGS. 3 and 5, or an elliptical base, as shown in FIG. 5. Other embodiments of lining plates 1, not shown in the drawings, include perforations 6 that have other shapes, such as circles, or which use IXPE, PU foam or PVC as a foam material for the self-adhesive layer, with a density equal to, or greater than, 50 Kg/m$^3$.

Figure 4:
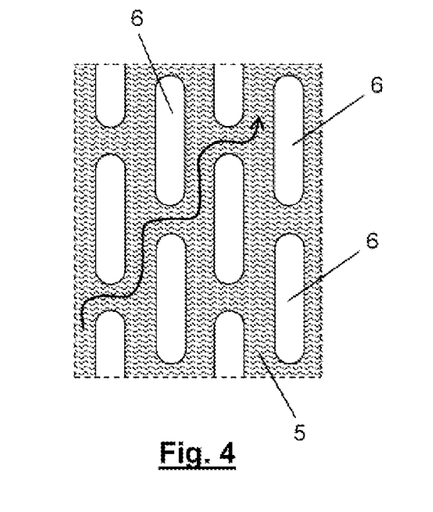
FIGS. 4 and 5 schematically show the distribution of the perforations of the self-adhesive layer according to two preferred embodiments for the plate of FIG. 1.

As shown in FIGS. 3, 4 and 5, the perforations 6 are arranged in a staggered formation throughout the entire surface of the lining plate 1. By staggered formation arrangement, we mean that the perforations 6 form parallel rows such that the perforations 6 of one row are arranged in a position approximately at the halfway point between the holes of the next row over, such that they preferably form equilateral triangles. Thus, in the example shown in FIG. 3, there are eight rows of perforations 6 in alternating positions, such that the space of adhesive surface between two contiguous perforations 6 in a row is occupied in the next row over by a perforation 6. Preferably, the oblong perforations 6 are oriented with the longest side thereof arranged parallel to the longest side of the lining plate 1. Thus, in the lining plate 1 of FIG. 3, the oblong perforations 6 follow a longitudinal direction.

This staggered formation arrangement prevents straight continuous strips of adhesive surface 5 from existing on central areas of the outer surface of the self-adhesive layer 4, since said strips would make it likely for part of the foam material of the self-adhesive layer 4 to remain stuck on the horizontal or vertical surface when the lining plate 1 is removed. In FIGS. 4 and 5, by means of arrows in a stepped trajectory, it is shown that in the central area of the lining plate 1 there is not a straight continuous strip provided with adhesive 5 because the spaces on the surface with adhesive 5 between two perforations 6 of a row are interrupted by the perforations 6 of the next row over.

However, the lining plate 1 does have two horizontal and two vertical continuous strips of adhesive 5 on its perimeter margins along the entire length and width of the plate in order to ensure that the lining plate 1 is correctly fixed to the horizontal surface 10 at the edges of the plate without causing an inconvenience when the surface of the plate is removed, since in these areas there is no residue adhered to the horizontal surface 10. Also in FIG. 3, one can see that the shortest sides of the lining plate 1 have smaller portions of perforations on the outer surface provided with adhesive 5 of the self-adhesive layer 4, equivalent to the break of a perforation 6 with an oblong contour in order to preserve the continuous perimeter margin, which it is provided with adhesive 5 throughout its entire length.

The perforation surface of the self-adhesive foam material layer 4 represents between 60% and 70% of the entire rectangular surface of the lining plate 1. The perforated surface that represents a perforation on the outer surface of the self-adhesive layer 4 depends on the total surface of the plate, although by way of example, a perforation 6 may be a perforation area on the outer surface from 0.7 cm$^2$ to 20 cm$^2$.

With regard to the materials, the support layer 3 comprises magnesium oxide or magnesium oxide with perlite and/or vermiculite and/or cellulose, or fiber cement (also known as fiber reinforced cement), or fiber cement with perlite and/or vermiculite and/or cellulose, or mortar with perlite and/or vermiculite and/or cellulose, with a thickness comprised between 3 and 10 mm. Preferably, the support layer 3 is of magnesium oxide with perlite, vermiculite and cellulose, with a thickness comprised between 3 and 5 mm, the preferred thickness being 3 mm. In addition to providing a robust quality to the plate, these materials have a high dimensional stability, since they absorb water or moisture without swelling or varying their dimensions, especially magnesium oxide, and have very good expansion and contraction coefficients in conditions of realistic temperatures in order to ensure a good performance, without the joints opening between the plates, without some plates pushing up against others and without breaks in the click or male-female connections which might be at the perimeter edges.

With regard to the decorative layer 2, it is preferable that it be a luxury vinyl tile (LVT) with a thickness comprised between 0.5 mm and 5 mm, even more preferably between 1.5 mm and 2 mm, although in other embodiments of the lining plate 1, PU or PVC may be considered for the decorative layer 2.

In FIGS. 1 and 2, it can be seen that on the lining plate 1, the adhesive 5 of the self-adhesive layer 4 is covered on its outside by a removable sheet of paper 7. This removable sheet of paper 7 is removed from the lining plate 1 by the user just before applying the sheet to the horizontal or vertical surface, thus preventing the lining from adhering to other surfaces or taking an incorrect position.

The perforations 6 with an oblong contour with which the self-adhesive EVA layer 4 is provided allow the user or worker who applies the lining on the horizontal or vertical surface 10 to fill in said perforations 6 with silicone or glue, or with a similar material, thereby reinforcing the adhesive properties of the plate on the horizontal or vertical surface 10, in addition to the adhesive action of the adhesive which is already provided on the outer surface of the foam material layer.

Figure 6:
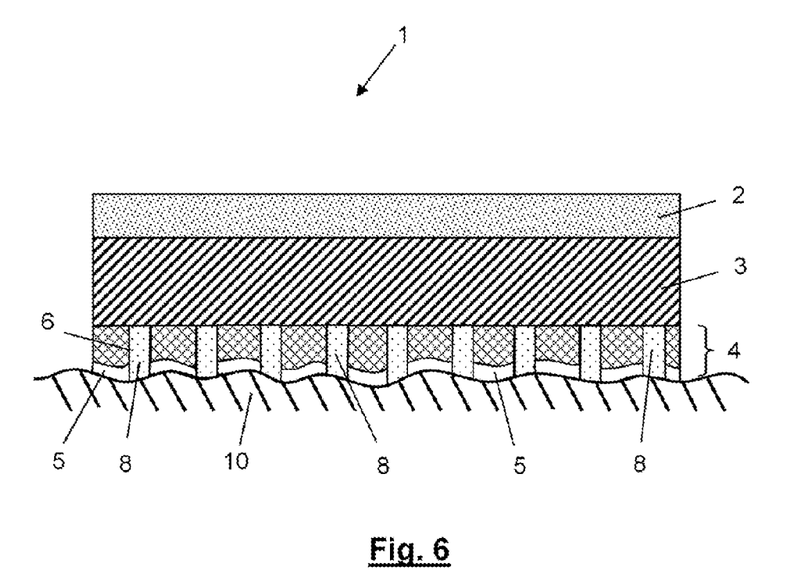
FIG. 6 is a cross-sectional view of the plate in FIG. 1, object of the invention, once the lining is placed on a horizontal surface.

In FIG. 6 the perforations 6 are shown to be filled with a filler 8 of acrylic-based glue, which is resistant to the temperature changes to which floor and wall linings are often subjected without breaking apart and is removable indefinitely, the lining plate 1 being able to be placed and removed from the surface without the plate leaving any residue of glue, adhesive or foam material. When the lining plate 1 is to be applied to a vertical surface, the perforations 6 will be filled with said acrylic-based glue, so that the lining plate adheres better to the surface and resists the weight of the lining plate. With regard to the lining on horizontal surfaces 10, in the majority of the cases it is not necessary to fill in the perforations 6, except in situations in which there are many people passing over them or when the finishing of the horizontal surface 10 is porous and has imperfections, as shown in FIG. 6.

Figure 7:
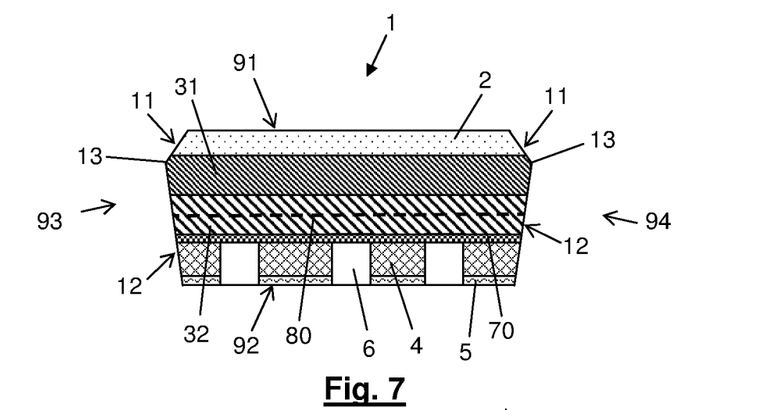
FIG. 7 is a cross-sectional view of a rectangular lining plate, object of the invention according to its second aspect, according to a cross section in a parallel direction to the shortest side of the plate.
Figure 8:
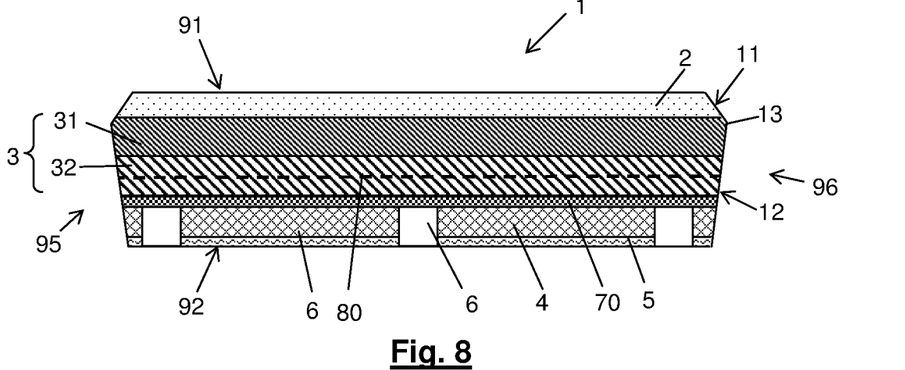
FIG. 8 is a cross-sectional view of the plate in FIG. 7 but according to a cross section with a direction parallel to the longest side of the plate.
Figure 9:
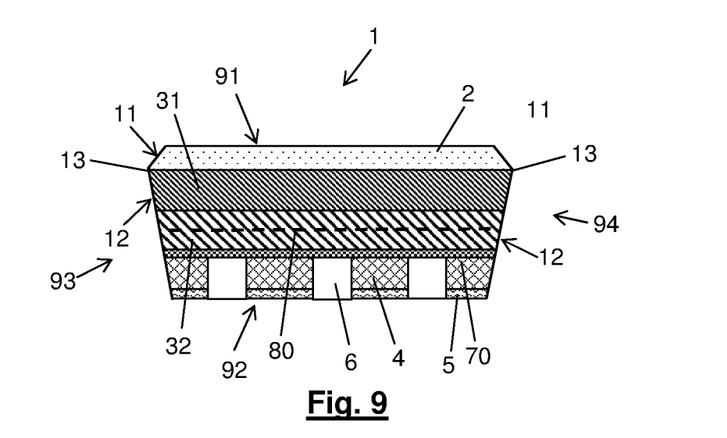
FIG. 9 is a cross-sectional view similar to FIG. 7 but of a second embodiment of the lining plate object of the invention according to its second aspect.

FIGS. 7 and 8 schematically show a cross section and a longitudinal section of a rectangular format lining plate 1 for covering or lining horizontal as well as vertical surfaces 10 (see FIGS. 14 and 15), for example floors or pavements, and vertical surfaces such as walls.

Figure 10:
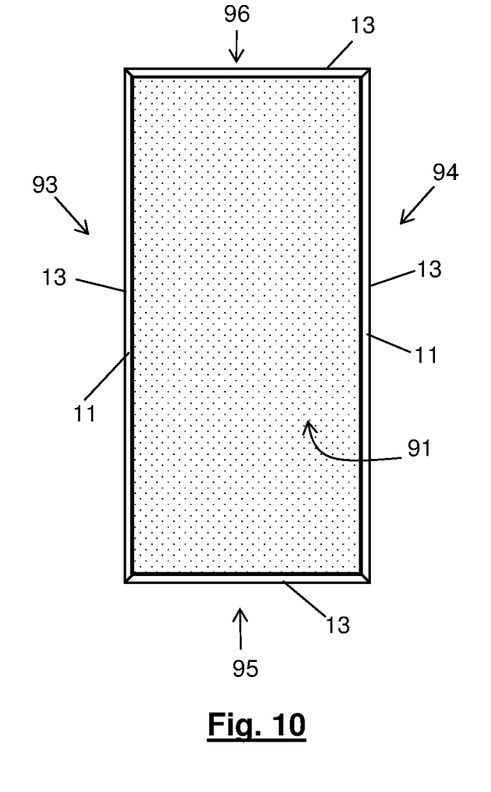
FIG. 10 is a view of the lining plate of FIG. 7 from its exposed face.
Figure 11:
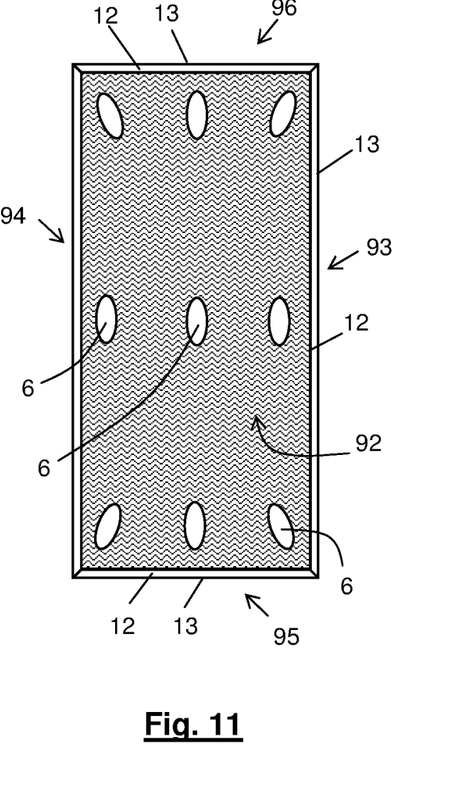
FIG. 11 is a view of the lining plate of FIG. 7 from its hidden face, wherein perforations are provided on the adhesive surface of the self-adhesive foam material layer.
Figure 12:
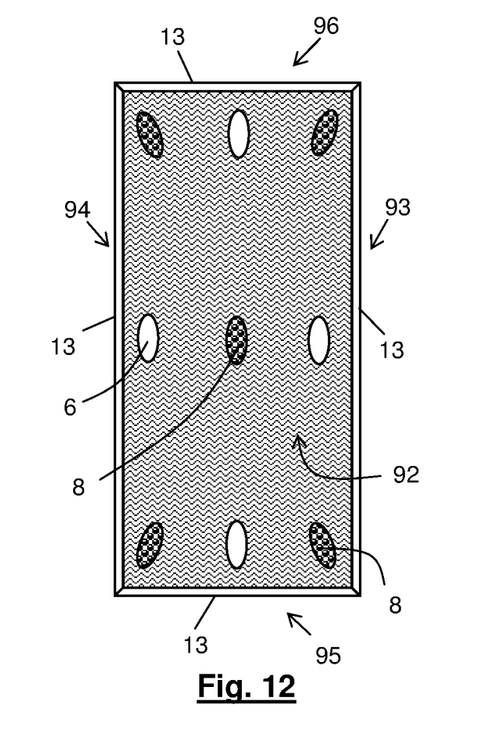
FIG. 12 is a same view as FIG. 11 but differing in that some of the perforations have been filled with acrylic-based glue before arranging the lining plate on the surface to be lined.
Figure 13:
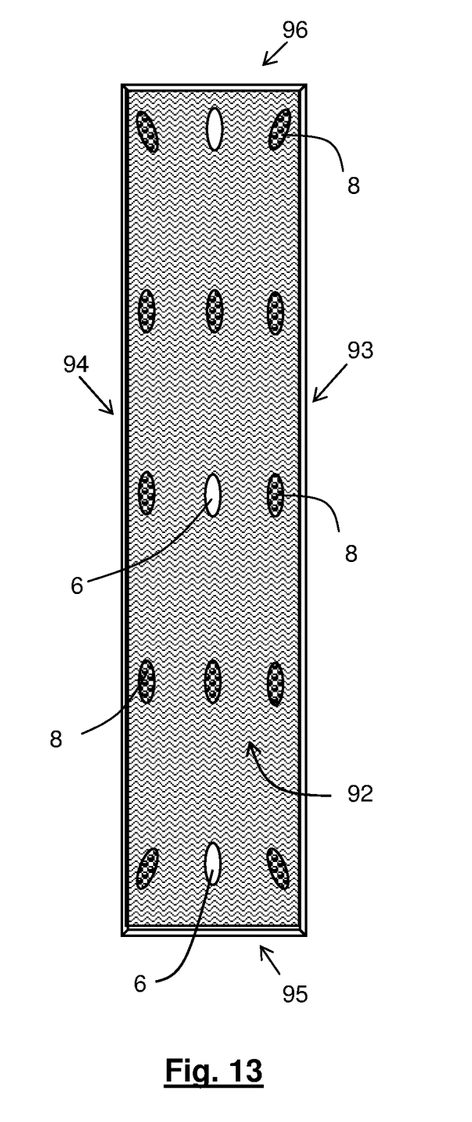
FIG. 13 is a view similar to FIG. 12 but of a lining plate with a rectangular format longer than that shown in FIG. 12.

The lining plate 1 shown is composed of the following layers arranged in order from its exposed face 91 (face intended to be exposed to the exterior, see FIG. 10) to its hidden face 92 (face intended to be oriented to the surface 10 to be coated or lined, see FIGS. 11-13):
- an outer decorative layer 2;
- a support layer 3 comprising at least one of the following materials from the group consisting of magnesium oxide, magnesium oxide with perlite and/or vermiculite and/or cellulose;
- a barrier layer or a barrier membrane 70 to reduce or avoid water and moisture intrusion, preferably being hydrophobic polyurethane; and
- a self-adhesive foam material layer 4 with an adhesive surface 5, intended to be placed on the surface 10 to be coated or lined, provided with a plurality of perforations 6.

The support layer 3 has a non-homogeneous density in its thickness, distinguishing a first thickness 31, following the decorative layer 2, and a second thickness 32, between the first thickness 31 and the barrier layer or the barrier membrane 70. The density of the support layer 3 in the first thickness 31 is between 1100 and 1200 Kg/m$^3$, whereas the density in the second thickness 32 is between 800 and 900 Kg/m$^3$.

To manufacture the support layer 3 there is a rectangular mold formed by a rectangular base and a perimeter frame of low height, or the mold is formed by a flat tray (practically without vertical edges), the base or tray being supported horizontally. Several components are poured from above. Among some of these components, there is a base material that sets or hardens when drying, or a chemical binder, mineral particles such as perlite or vermiculite, aggregates, high performance modifiers, pigments, etc. Preferred further components forming the support layer 3 are perlite (preferably ground pearlite), magnesium sulfate (MgSO$_4$), wood particles and lithopone.

When the magnesium oxide is added to the materials already poured into the mold, by gravity and their small size in relation to the other components, the magnesium oxide particles passes between the other components and are deposited to a greater extent in the lower half of the mold thickness. In addition, the mold or the tray is also subjected to vibration and then is left to dry. The bottom of the mold, where most of magnesium oxide particles are deposited, presents a surface of fine finish, since said particles are of small size. For this reason, this surface of the support layer 3 is chosen for its subsequent bonding by gluing with the decorative layer 2. As a result, a support layer 3 is obtained wherein a first thickness 31 and a second thickness 32 with a lower density than the first one are distinguished.

Once the support layer 3 has been extracted from the mold, the part corresponding to the first thickness 31 will be the one to be joined to the decorative layer 2, since it is the part that occupied the lower half of the mold and which results in having a greater density and a smoother surface finish.

It should be mentioned that the arrangement of the horizontal mold is also used to introduce a reinforcing structure 80 formed by meshes or a fabric, pressing the structure until sinking it is approximately at a quarter of the total thickness of the support layer 3. The reinforcing structure 80 is formed by meshes, for example, in the form of quadrilaterals, of a composite material such as fiberglass. The reinforcing structure 80 contributes to not transmitting the bending of the decorative layer 2, which usually comprises polyvinyl chloride (PVC), to the support layer 3 when the PVC is subjected to high temperatures or considerable temperature differences in its surface.

The decorative layer 2 is preferably a floor or luxury vinyl tile (LVT), based on PVC, and its density is approximately 1500 Kg/m$^3$. LVT is made up of several layers, the main component of which is PVC. By being attached to the part of the support layer 3 corresponding to the first thickness 31, with a density between 1100 and 1200 Kg/m$^3$, a balance of the densities of the layers is achieved since the density of the decorative layer 2, mainly made of vinyl, is closer to the density of the first thickness 31 than to the density of the second thickness 32.

In terms of thicknesses, a balance between the different layers has also been sought. Thus, the decorative layer 2 preferably has a thickness of about 1 mm when it is made of vinyl, and the support layer 3 has a total thickness of about 3 mm, distributed in 1.5 mm of the first thickness 31 and 1.5 mm of the second thickness 32. The reinforcing structure 80 is located approximately in the middle of the second thickness 32 in a plane roughly parallel to the layer arrangement in the lining plate 1.

Then, the barrier layer or the barrier membrane 70 is joined to the face of the support layer 3 corresponding to the second thickness 32 to reduce or prevent water and moisture intrusion. Said barrier membrane 70 is a varnish or paint of hydrophobic polyurethane and once the polyurethane is dried, the self-adhesive foam material layer 4 is glued thereto. The plurality of perforations 6 may have already been made to the self-adhesive foam material layer 4.

The foam material layer 4 has a density equal to or greater than 25 Kg/m$^3$ and is preferably made of IXPE, i.e. cross-linked polyethylene foam. The adhesive surface 5 of the foam material layer 4 contains an adhesive compatible with the foam material 4 and its basic component is ethyl acetate. Although not shown in the drawings, the lining plate 1 is usually presented with the adhesive surface 5 covered externally by a removably sheet of paper 7. This removable sheet of paper 7 is removed from the lining plate 1 by the user just before applying the sheet to the horizontal or vertical surface 10, thus preventing the lining plate 1 from adhering to other surfaces or taking an incorrect position.

In FIGS. 10 and 11 of the rectangular-shaped lining plate 1, it is observed that each of the four lateral edges 93, 94, 95 and 96 is configured by a first inclined lateral surface 11, which encompasses at least the part of the lateral side corresponding to the decorative layer 2, and by a second inclined lateral surface 12, which encompasses the rest of the lateral side, the intersection of the two inclined lateral surfaces 11 and 12 forming an edge 13 on the part of the lateral side corresponding to the support layer 3 shown in FIGS. 7 and 8. The projecting edge 13 is located in the part of the support layer 3, particularly in the first thickness 31. However, in FIG. 9. there is another embodiment of the lining plate 1 in which the edge 13 is located at the height of the junction between the decorative layer 2 and the support layer 3. In FIGS. 7-9 and 14-15 it is appreciated that the first inclined lateral surface 11 and the second inclined lateral surface 12 form an interior angle (measured from inside the lining plate 1) greater than 70° and less than 180°.

By way of example of embodiment, the second inclined lateral surface 12, which configures the part of the lining plate 1 encompassing the protruding edge 13 to the adhesive surface 5 on each lateral side 93, 94, 95, 96, forms preferably an angle comprised between 75° and 80° measured from the outside of the second inclined lateral surface 12 with a plane parallel to the surface of the hidden face 92 of the lining plate 1.

It should be mentioned that in the lining plates 1 shown in the drawings, the four lateral sides 93, 94, 95 and 96 are configured with a first inclined lateral surface 11 and a second inclined lateral surface 12 which converge in an edge 13 projecting from the respective lateral side 93, 94, 95, 96. However, other embodiments of the lining plate 1 may consider that only two mutually opposite lateral sides 93-94 or 95-96 have said inclined surface configuration.

Figure 15:
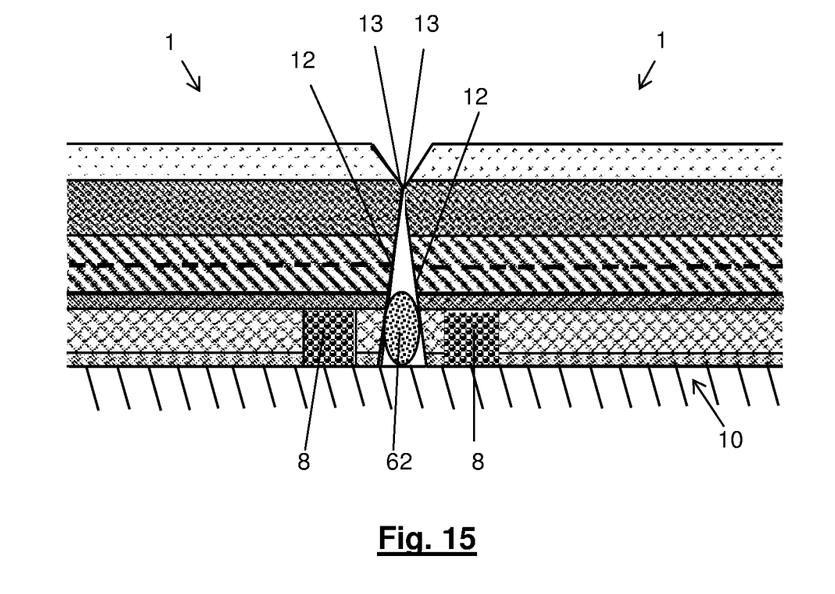
FIG. 15 is a detailed view of the arrangement of two lining plates like the one of FIG. 8 contacting by the projecting edges of their opposed lateral sides, showing a sealant silicone cord in the gap or space between the second inclined lateral surfaces of the lining plates.

This configuration of the lateral sides 93, 94, 95 and 96 allows a simple way of placing adjacent lining plates 1 on the surface 10 to be coated or lined. The lining plates 1 are placed next to one another with their projecting edges 10 of their side edges 96-95, 94-93 in contact. An observer visualizing the lining place on the surface 10 will see a surface completely coated or lined, without joints. However, because the lateral edges comprise the second inclined lateral surfaces 12, a space or gap is created between said opposite second inclined lateral surfaces 12, the respective projecting edges 13 and the part of the surface 10 on which the lining plates 1 have been placed. A silicone cord 62 will be placed in this space, which obviously will have to be placed on the part of the surface 10 that is next to the second inclined lateral surface 12 of the first lining plate 1 that has been placed, before placing the second adjacent lining plate 1. The silicone cord 62, or similar sealing material, will not be visible from the outside, but will continue to protect from undesired condensation on the surface 10. Furthermore, the contact between the projecting edges 13 contributes greatly to physically avoid that cleaning liquids or condensations on the decorative layers 2 of the lining plates 1 may access the space of the joint between said lining plates 1.

In this way, the placement of the lining plates 1 is very easy. The operator can be guided by the contact of the respective projecting edges 13 that occurs when the second lining plate 1 is placed next to another one already placed on the surface 10. In addition, two lining plates 1 placed in this way can rotate around their respective projecting edges 13 by which they contact each other and this allows the plates to be inclined respectively to better adapt to the morphology of the surface 10 being lined without being perceptible from the outer separation joints.

Advantageously, the lining plates 1 are presented to the operator or user who wishes to line a horizontal or vertical surface 10 as a part of a lining kit or a lining system that, in addition to a plurality of lining plates 1 to cover or line the area of the surface 10, comprises a first container containing a filler 8 which is an acrylic-based glue for filling some or all of the perforations 6 of the liner plates 1, and a second container containing silicone sealant for arranging a cord 62 of said silicone in the space described above between the two second inclined surfaces 12, as shown in FIG. 15.

With regard to the perforations 6 of which the foam material layer 4 is provided, and also its adhesive surface 5, it should be mentioned that said perforations 6 are communicating with the barrier membrane 70 to reduce or prevent water and moisture intrusion (made of hydrophobic polyurethane), so that the bottom of each perforation 6 is formed by a portion of this barrier membrane 70. The perforations 6 have preferably an elliptical or oblong outline or contour on the adhesive surface 5, as shown in FIGS. 11-13, oriented mostly in the direction of the length of the lining plate 1.

Although there are different patterns of distribution of the perforations 6, and starting from the basis that the lining plate 1 has a rectangular format, a perforation 6 is preferably provided in each corner area of a rectangle which configures the hidden face 92 of the lining plate 1, and lateral margins of said rectangle are provided at least with a perforation 6 located between said corner perforations 6. In FIGS. 12 it is seen, unlike FIG. 11, that some of the perforations 6 have been filled with acrylic-based glue (filler 8) before arranging the lining plate 1 on the surface 10 to be lined. FIG. 13 shows a format of lining plate format that is more elongated than that of FIG. 12.

Figure 14:
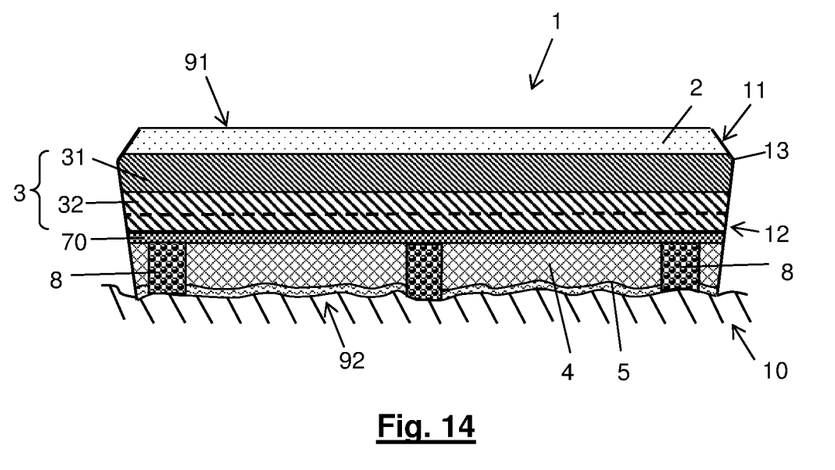
FIG. 14 is a view of the lining plate of FIG. 8 wherein said plate is shown arranged lining a part of a surface that has some irregularities and wherein the perforation of the plate have been filled with acrylic-based glue.

The acrylic base glue of the filler 8 is resistant to the temperature changes to which the floor and wall lining plates are usually subjected without decomposing and can be removed practically indefinitely, thus being able to place and remove the lining plate 1 from the surface 10 without the plate leaving any traces of glue, adhesive or foam material. When the liner plate 1 is to be applied on a vertical surface 10, the perforations 6 will be filled with said acrylic-based glue so that the lining plate 1 will be adhered better to the surface 10 and resist the weight of the lining plate 1 itself. In relation to the lining of horizontal surfaces 10, in most cases it is not necessary to fill the perforations 6, except in those situations where there is a lot of traffic of people or when the finish of the horizontal surface 10 is porous and has some imperfections, as shown in FIG. 14.

The invention claimed is:
1. A lining plate for vertical and horizontal surfaces, which comprises at least one of the following layers arranged in order from an exposed face, intended to be exposed to the exterior, to a hidden face, intended to be oriented to the surface to be lined:
   an outer decorative layer;
   a support layer comprising at least one of the following materials from the group consisting of magnesium oxide, magnesium oxide with perlite and/or vermiculite and/or cellulose;
   a self-adhesive foam material layer with a surface provided with an adhesive surface intended to be placed on the surface to be lined, the self-adhesive foam material layer being provided with a plurality of perforations;

wherein the lining plate comprises a barrier layer or a barrier membrane to reduce or avoid water and moisture intrusion, being provided between the support layer and the self-adhesive foam material layer;

wherein the support layer has a non-homogeneous density in its thickness, distinguishing a first thickness, following the decorative layer, and a second thickness, between the first thickness and the barrier layer or the barrier membrane, in which the density of the support layer in the first thickness is greater than the density in the second thickness;

and wherein the support layer is provided with a reinforcing structure formed by meshes or by a fabric, being of a composite material, the reinforcing structure being located within the second thickness of the support layer.

2. The lining plate according to claim 1, wherein the barrier layer or the barrier membrane is made of hydrophobic polyurethane.

3. The lining plate according to claim 1, wherein the composite material of the reinforcing structure is made of fiberglass.

4. The lining plate according to claim 1, wherein density in the first thickness of the support layer is greater than 1000 $Kg/m^3$ and density in the second thickness of the support layer is less than 1000 $Kg/m^3$.

5. The lining plate according to claim 4, wherein density in the first thickness of the support layer is comprised between 1100 and 1200 $Kg/m^3$, and density in the second thickness of the support layer is comprised between 800 and 900 $Kg/m^3$.

6. The lining plate according to claim 1, wherein at least two of lateral sides of the lining plate opposite each other are each one configured by a first inclined lateral surface, which encompasses at least the whole part of the lateral side corresponding to the decorative layer, and by a second inclined lateral surface, which encompasses the rest of the lateral side of the lining plate, wherein the intersection of the two inclined lateral surfaces forms an edge projecting on the part of the lateral side corresponding to the support layer, and wherein the first inclined lateral surface and the second inclined lateral surface form an inner angle greater than 70° and less than 180°.

7. The lining plate according to claim 6, wherein the lining plate has four lateral sides and each one is configured by a first inclined lateral surface, which encompasses at least a part of the lateral side corresponding to the decorative layer, and by a second inclined lateral surface, which encompasses the rest of the lateral side of the lining plate, wherein the intersection of the two inclined lateral surfaces forms an edge projecting on the part of the lateral side corresponding to the support layer, and wherein the first inclined lateral surface and the second inclined lateral surface form an inner angle greater than 70° and less than 180°.

8. The lining plate according to claim 7, wherein the second inclined lateral surface, which configures the part of the lateral side of the lining plate encompassing the part from the projecting edge to the self-adhesive foam material layer, forms an angle comprised between 75° and 80° measured from the outside of the second inclined lateral surface with a plane parallel to the surface of the hidden face of the lining plate intended to be oriented to the surface to be lined.

9. The lining plate according to claim 6, wherein each projecting edge is located in the part of a respective lateral side corresponding to the first thickness of the support layer, wherein the first inclined lateral surface encompasses the whole part of the lateral side of the decorative layer and a part of the lateral side of the first thickness, and wherein the second inclined lateral surface encompasses the remaining part of the lateral side of the lining plate which goes from the projecting edge to the adhesive surface of the self-adhesive foam material layer.

10. The lining plate according to claim 6, wherein the first thickness and the second thickness of the support layer have a same thickness value, comprised between 1.3 and 1.8 mm.

11. The lining plate according to claim 10, wherein the first thickness and the second thickness of the support layer have each one thickness value of 1.5 mm.

12. The lining plate according to claim 10, wherein the barrier layer or the barrier membrane is made of hydrophobic polyurethane, wherein the composite material of the reinforcing structure is made of fiberglass, wherein density in the first thickness of the support layer is greater than 1000 $Kg/m^3$ and density in the second thickness of the support layer is less than 1000 $Kg/m^3$, wherein the self-adhesive foam material layer has a density which is equal to or greater than 25 $Kg/m^3$ and is made of an irradiation cross-linked polyethylene (IXPE) foam, wherein the decorative layer has a density comprised between 1450 $Kg/m^3$ and 1550 $Kg/m^3$ and is made of a luxury vinyl tile (LVT) or a polyvinyl chloride (PVC) sheet, with a thickness comprised between 0.3 and 5 mm, and wherein the perforations of the self-adhesive foam material layer reach the barrier layer or the barrier membrane in such a way that the bottom of each perforation is formed by a section of the barrier layer or the barrier membrane.

13. The lining plate according to claim 12, wherein the adhesive of the self-adhesive layer comprises ethyl acetate.

14. The lining plate according to claim 6, wherein the support layer further comprises magnesium sulfate.

15. The lining plate according to claim 12, wherein support layer further comprises magnesium sulfate.

16. The lining plate according to claim 6, wherein the support layer further comprises magnesium sulfate, pearlite, bits of wood and lithopone.

17. The lining plate according to claim 12, wherein the support layer further comprises magnesium sulfate, pearlite, bits of wood and lithopone.

18. The lining plate according to claim 13, wherein the support layer further comprises magnesium sulfate, pearlite, bits of wood and lithopone.

19. The lining plate according to claim 12, wherein the perforations have an elliptical or oblong contour on the adhesive surface, wherein the lining plate has a rectangular format, wherein a perforation is provided in each corner area of a rectangle which configures the hidden face of the lining plate, and wherein lateral margins of said rectangle are provided at least with a perforation located between the corner perforations.

20. A kit for lining vertical and horizontal surfaces, comprising a plurality of lining plates as defined in claim 12, a first container of a glue for filling some or all of the perforations of the lining plates, and a second container of sealant silicone to apply in a gap between the respective second lateral surfaces of pairs of lining plates to be disposed adjacent.

21. The kit for lining vertical and horizontal surface according to claim 20, wherein the support layer of the lining plates further comprises magnesium sulfate, pearlite, bits of wood and lithopone and wherein the adhesive of the self-adhesive layer comprises ethyl acetate.

* * * * *